United States Patent
Ndagijimana et al.

(10) Patent No.: US 9,283,737 B2
(45) Date of Patent: Mar. 15, 2016

(54) JOINING PROCESS FOR THE COHESIVE CONNECTION, IN SECTIONS, OF AT LEAST TWO COMPONENTS

(75) Inventors: Robin Ndagijimana, Neuss (DE); Simon Fleischheuer, Mühlheim an der Ruhr (DE); Harald Mund, Linnich (DE); Wolfgang Pellenz, Meckenheim (DE)

(73) Assignee: Johnson Controls Technology Company, Holland, MI (US)

( * ) Notice: Subject to any disclaimer, the term of this patent is extended or adjusted under 35 U.S.C. 154(b) by 137 days.

(21) Appl. No.: 14/129,896

(22) PCT Filed: Mar. 9, 2012

(86) PCT No.: PCT/EP2012/054100
§ 371 (c)(1),
(2), (4) Date: Mar. 31, 2014

(87) PCT Pub. No.: WO2013/000591
PCT Pub. Date: Jan. 3, 2013

(65) Prior Publication Data
US 2014/0196829 A1    Jul. 17, 2014

(30) Foreign Application Priority Data

Jun. 30, 2011 (DE) .......................... 10 2011 107 635
Jul. 1, 2011 (DE) .......................... 10 2011 107 825

(51) Int. Cl.
| | |
|---|---|
| *B29C 65/00* | (2006.01) |
| *B32B 37/12* | (2006.01) |
| *F16B 11/00* | (2006.01) |
| *B64C 1/00* | (2006.01) |
| *B64C 1/06* | (2006.01) |
| *B60N 2/68* | (2006.01) |

(Continued)

(52) U.S. Cl.
CPC ............... *B32B 37/12* (2013.01); *F16B 11/006* (2013.01); *B29C 66/022* (2013.01); *B29D 99/001* (2013.01); *B32B 38/0012* (2013.01); *B60N 2/68* (2013.01); *B64C 1/064* (2013.01); *B64C 2001/0072* (2013.01); *Y10T 156/10* (2015.01)

(58) Field of Classification Search
CPC ............ B64C 2001/0072; B64C 1/064; B29C 66/022; B32B 38/0012; B29D 99/001; B60N 2/68
USPC ......................................................... 156/196
See application file for complete search history.

(56) References Cited

U.S. PATENT DOCUMENTS

| | | | |
|---|---|---|---|
| 6,079,766 A * | 6/2000 | Butler et al. ............... | 296/146.5 |
| 2003/0088983 A1 | 5/2003 | Wang et al. | |
| 2008/0001429 A1* | 1/2008 | Willis et al. ............... | 296/181.2 |

FOREIGN PATENT DOCUMENTS

| | | | |
|---|---|---|---|
| DE | 196 32 275 A1 | 2/1998 | |
| EP | 1 975 216 A1 | 10/2008 | |

(Continued)

OTHER PUBLICATIONS

International Search Report mailed May 30, 2012, as received in corresponding International Application No. PCT/EP2012/054100.

(Continued)

*Primary Examiner* — Carson Gross
(74) *Attorney, Agent, or Firm* — Foley & Lardner LLP (57) ABSTRACT

In a joining process for the cohesive connection of at least two components, a profile component is cohesively connected to a component of areal form. Formed into the component of areal form is at least one stamped portion, the height of which is formed so as to correspond to a minimum layer thickness of the cohesive connection.

9 Claims, 5 Drawing Sheets

(51) Int. Cl.
*B32B 38/00* (2006.01)
*B29D 99/00* (2010.01)

(56) References Cited

FOREIGN PATENT DOCUMENTS

| JP | H01-132807 U | 9/1989 |
| JP | 06-042436 U | 6/1994 |
| JP | H06-42436 U | 6/1994 |
| JP | 2007-046646 A | 2/2007 |
| JP | 2008-215423 A | 9/2008 |
| JP | 2009-242465 A | 10/2009 |

OTHER PUBLICATIONS

Search Report dated Jul. 14, 2015 in corresponding European application No. 12 710 895.9, 4 pages.

* cited by examiner

JOINING PROCESS FOR THE COHESIVE CONNECTION, IN SECTIONS, OF AT LEAST TWO COMPONENTS

CROSS REFERENCE TO RELATED APPLICATIONS

The present application is a U.S. National Stage of International Application No. PCT/EP2012/054100, filed on Mar. 9, 2012, which claims the benefit of German Patent Application No. 10 2011 107 635.6, filed on Jun. 30, 2011, and German Patent Application No. 10 2011 107 825.1, filed Jul. 1, 2011, the entire disclosures of all of which are incorporated herein by reference.

The invention relates to a joining process for the cohesive connection, at least in sections, of at least two components, according to the preamble of claim 1.

In the prior art, structural elements, in particular of vehicle rear seats, are formed from steel and/or sheet-metal components welded to one another.

It is the object of the present invention to specify a joining process for the cohesive connection of at least two components, which joining process is improved in relation to the prior art.

With regard to the joining process for the cohesive connection, at least in sections, of at least two components, the object is achieved by the features specified in claim 1.

Advantageous developments of the invention are the subject matter of the dependent claims.

In the joining process for the cohesive connection of at least two components, according to the invention a profile component is cohesively connected to a two-dimensionally shaped component, wherein at least one stamped portion is introduced into the two-dimensionally shaped component, the height of which stamped portion is designed so as to correspond to a minimum layer thickness of the cohesive connection. This makes it possible to maintain a uniform layer thickness of the adhesive connection along the entire adhesive connection, wherein, in particular, tilting of the two components with respect to each other and a resulting non-uniformly formed layer thickness of the adhesive connection is prevented.

Hybrid components which consist of two individual components and are produced by means of the process are advantageously reduced in weight and particularly flexurally rigid.

The cohesive connection is preferably designed as an adhesive connection, wherein an adhesive agent is arranged between profile component and component.

In an advantageous embodiment, the profile component has a substantially planar flange region, by means of which the profile component is placed onto the two-dimensionally shaped component.

In a preferred variant embodiment, the stamped portion is formed raised in a direction facing away from the profile component, wherein the adhesive connection between profile component and two-dimensionally shaped component is formed in the region of the stamped portion. A predeterminable minimum layer thickness of the adhesive connection can therefore be maintained in a simple manner.

A load-bearing capacity of the adhesive connection between the two components is advantageously increased because of the uniform layer thickness of the adhesive connection.

At least one stamped portion is expediently arranged in the component, said stamped portion extending along a longitudinal extent of the flange region of the profile component. In this case, the stamped portion is formed so as to correspond to the flange region, wherein a width of the flange region corresponds to a width of the stamped portion, and a height of the stamped portion is designed so as to correspond to a minimum layer thickness of the adhesive agent of the adhesive connection. Application tolerances of the adhesive agent of the adhesive connection can particularly advantageously be reduced as a result, thus permitting high replication accuracy in series production.

Deviations in an effective size, in particular of the layer thickness, of the adhesive connections are expediently avoided.

In an alternative variant embodiment, the profile component has a U-shaped cross section on which a substantially planar flange region is formed in each case on both sides. In this case, the U-shaped profile component is placed with the flange regions thereof onto the component in such a manner that an interior space is formed between profile component and component.

Advantageously, stamped portions are introduced into the two-dimensionally shaped component along a longitudinal extent of the flange regions of the profile component, the height of which stamped portions is designed so as to correspond to a minimum layer thickness of the adhesive connection and which stamped portions are formed raised in the direction of the profile component and are arranged between the components in such a manner that they interrupt the linear or virtually linear adhesive connection between the components, wherein the profile component arranged on the component rests with the flange regions thereof at least in sections on the stamped portions. The stamped portions here can protrude over the flange regions laterally and/or on the end side.

Stamped portions and portions coated with adhesive agent are therefore arranged in an alternating manner over the course of the flange region. No adhesive agent is arranged in particular in the region of the stamped portions.

An extensive cohesive connection, which is customary in the prior art, between profile component and component is thereby avoided. Particularly advantageously, the surface unevennesses, such as, for example, bulges or waves, resulting from such an extensive cohesive connection and the different thermal expansions of the materials of profile component and component are reliably avoided in the hybrid component manufactured according to the invention.

In preferred embodiments, recesses are arranged in the stamped portions and in the flange regions, said recesses being formed so as to correspond and being arranged congruently one above another when the adhesive connection is formed. This makes it possible, for example by means of the insertion of a spike or a similar aid, for the components to be aligned, positioned and/or fixed exactly with respect to one another during the formation of the adhesive connection.

The adhesive connection between profile component and component can expediently additionally be secured by means of a plurality of nonreleasable rivet connections which can be formed in the recesses.

The invention is explained in more detail with reference to the attached schematic figures, in which.

Parts corresponding to one another are provided with the same reference symbols in all of the figures.

Figure 1:
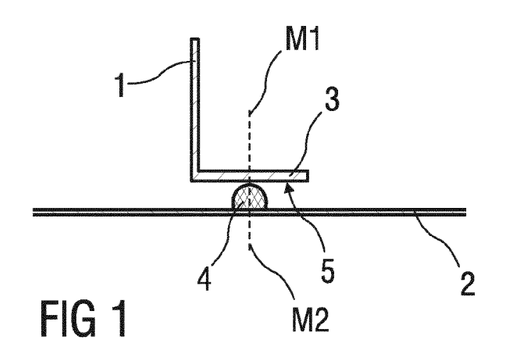
FIG. 1 shows schematically an end-side view of an adhesive connection to be formed between a profile component and a two-dimensionally shaped component during an application of adhesive agent without application tolerance according to the prior art.

FIG. 1 schematically illustrates an end-side view of an adhesive connection to be formed between a profile component 1 and a two-dimensionally shaped component 2 during an application of adhesive agent without application tolerance according to the prior art.

Figure 2:
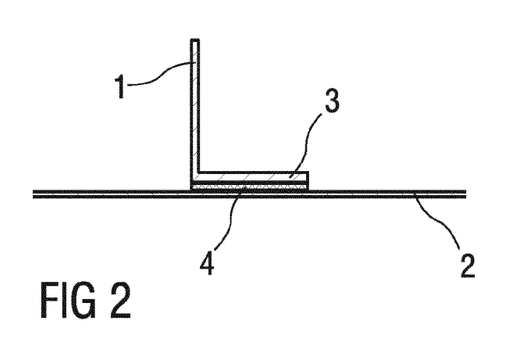
FIG. 2 shows schematically an end-side view of an adhesive connection formed between a profile component and a two-dimensionally shaped component during an application of adhesive agent without application tolerance according to the prior art.

FIG. 2 schematically illustrates an end-side view of an adhesive connection formed between a profile component 1 and a two-dimensionally shaped component 2 during an application of adhesive agent without application tolerance according to the prior art.

In a first variant embodiment, the profile component 1 is preferably of L-shaped design and the component 2 is preferably shaped two-dimensionally. The profile component 1 and the component 2 here can be formed from different materials, for example aluminum, steel or plastic, or they can both be composed of the same material.

A substantially planar flange region 3 is formed on the profile component 1.

The component 2 is formed, for example, as a conventional, substantially flat sheet-metal section onto which the profile component 1 is placed by the flange region 3 thereof. An adhesive agent 4, for example a conventional adhesive, is arranged, at least in sections, between the component 2 and the flange region 3 of the profile component 1, said adhesive agent forming an adhesive connection.

In an adhesive connection without application tolerance of the adhesive agent 4, wherein the bead-shaped and/or linear application of adhesive agent, as illustrated in FIGS. 1 and 2, is undertaken centrally in a central region of the adhesive connection to be formed, an effective size of the adhesive connection corresponds to a base surface 5 of the flange region 3 of the profile component 1. The application tolerance here is understood as meaning a deviation of the position of the center line $M_1$ of the flange region 3 from a position of a center line $M_2$ of the adhesive agent 4. During an application of adhesive agent without application tolerance, the center lines $M_1$ and $M_2$ are arranged congruently.

Figure 3:
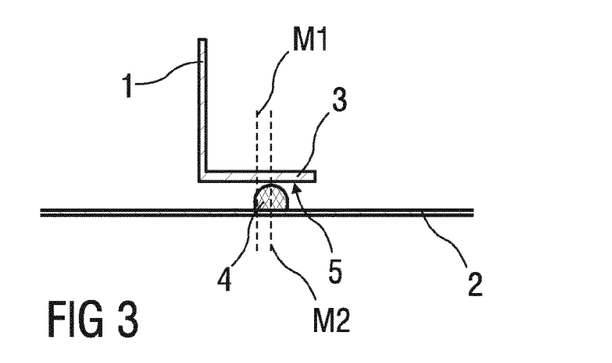
FIG. 3 shows schematically an end-side view of an adhesive connection to be formed between a profile component and a two-dimensionally shaped component during an application of adhesive agent with application tolerance according to the prior art.

FIG. 3 schematically illustrates an end-side view of an adhesive connection to be formed between a profile component 1 and a two-dimensionally shaped component 2 during an application of adhesive agent with application tolerance according to the prior art.

Figure 4:
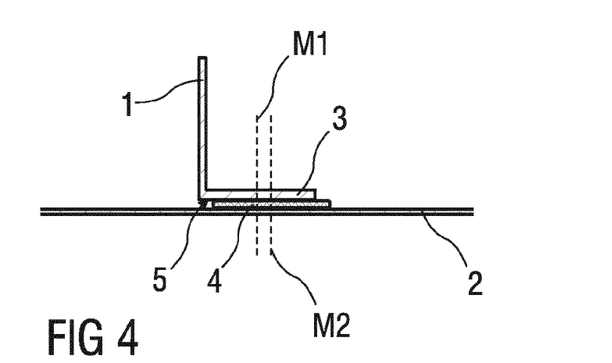
FIG. 4 shows schematically an end-side view of an adhesive connection formed between a profile component and a two-dimensionally shaped component during an application of adhesive agent without application tolerance according to the prior art.
Figure 5:
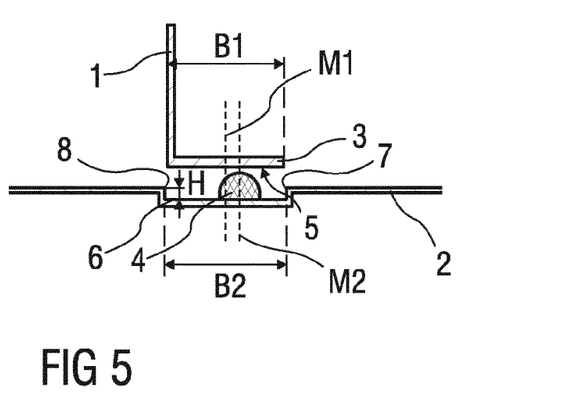
FIGS. 5 to 8 show schematically a process sequence for the formation according to the invention of an adhesive connection between a profile component and a two-dimensionally shaped component during an application of adhesive agent with application tolerance.
Figure 6:
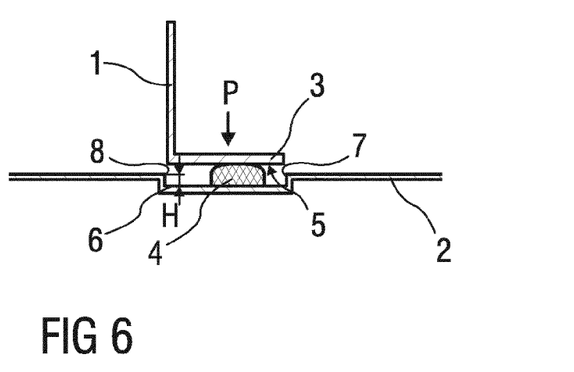

FIG. 4 schematically illustrates an end-side view of an adhesive connection formed between a profile component 1 and a two-dimensionally shaped component 2 during an application of adhesive agent with application tolerance according to the prior art.

In this case, the bead-shaped and/or linear application of adhesive agent is undertaken eccentrically in the region of the adhesive connection to be formed, and therefore the position of the center line $M_2$ of the adhesive agent 4 is not oriented congruently with respect to the position of the center line $M_1$ of the flange region 3. The adhesive agent 4 is thereby distributed nonuniformly under the flange region 3. As a result, the adhesive agent 4 does not completely wet the base surface 5 of the flange region 3, and therefore the effective size of the adhesive connection is reduced in comparison to the base surface 5 of the flange region 3, and a resulting load-bearing capacity of the adhesive connection is reduced.

FIGS. 5 to 8 schematically illustrate a process sequence for the formation according to the invention of an adhesive connection between the profile component 1 and the two-dimensionally shaped component 2 during an application of adhesive agent with application tolerance.

In this case, at least one stamped portion 6 is arranged in the component 2 along a longitudinal extent of the flange region 3 of the profile component 1. The stamped portion 6 here is formed so as to correspond to the flange region 3; in particular, a width $B_1$ of the flange region 3 corresponds to a width $B_2$ of the stamped portion 6. Said stamped portion 6 is preferably formed as a conventional depression and is introduced into the component 2 by means of a conventional stamping process. The stamped portion 6 is formed raised in a direction facing away from the profile component 1.

A height H of the stamped portion 6 is designed so as to correspond to a minimum layer thickness of the adhesive agent 4 of the adhesive connection.

Figure 7:
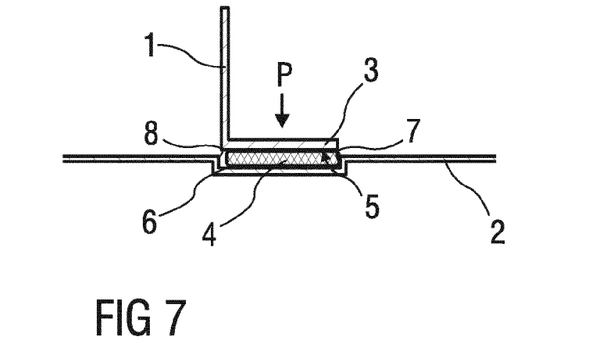
Figure 8:
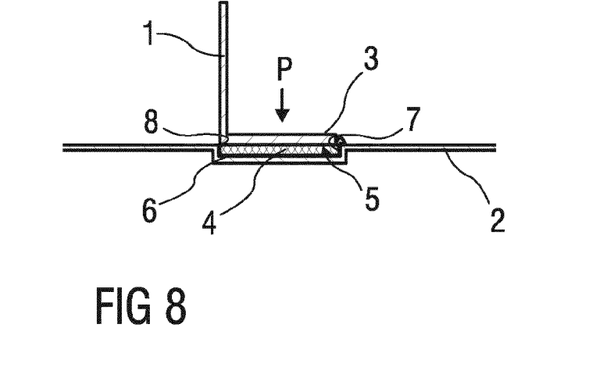

During the production of the adhesive connection between the component 2 and the flange region 3 of the profile component 1, the bead-shaped and/or linear application of adhesive agent is undertaken centrally in the stamped portion 6. The profile component 1 is then placed onto the component 2 and the adhesive agent 4. In the process, a pressing force P necessary for forming the adhesive connection is introduced into the profile component 1, preferably in the flange region 3. The pressing force P causes the adhesive agent 4 to be distributed uniformly in the stamped portion 6. Should an application tolerance of the adhesive agent 4 arise in the process, the spreading adhesive agent 4 strikes against a side edge 7 of the stamped portion 6 when the profile component 1 is pressed down, as illustrated in FIG. 7, thus significantly increasing a resistance of the adhesive agent 4 to flow. As a result, a direction of flow of the adhesive agent 4 is predominantly directed toward the opposite side edge 8 of the stamped portion 6 such that, in spite of the application tolerance of the adhesive agent 4, the adhesive agent 4 is uniformly distributed in the stamped portion 6 and on the base surface 5 of the flange region 3.

Figure 9:
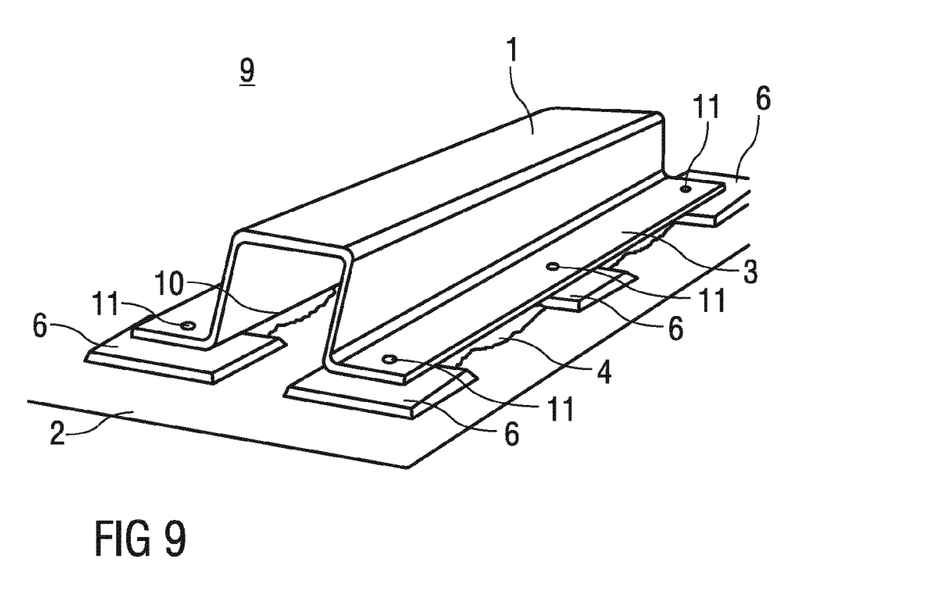
FIG. 9 shows schematically a perspective illustration of an alternative variant embodiment of a hybrid component formed from two individual components by means of a cohesive connection.

FIG. 9 schematically shows a perspective illustration of an alternative variant embodiment of a hybrid component 9 formed from two individual components 1 and 2 by means of a cohesive connection.

The hybrid component 9 is preferably formed from a U-shaped profile component 1 and a two-dimensionally shaped component 2. In this case, the profile component and the component 2 can be formed from different materials, for example aluminum, steel or plastic, or they can both be composed of the same material.

A substantially planar flange region 3 is formed in each case on both sides of the U-shaped profile component 1.

The component 2 is formed, for example, as a conventional, substantially flat sheet-metal portion onto which the U-shaped profile component 1 is placed with the flange regions 3 thereof in such a manner that an interior space 10 is formed between profile component 1 and component 2.

The adhesive agent 4 is arranged in sections between the component 2 and the flange regions 3 of the profile component 1, said adhesive agent forming an adhesive connection.

Along a longitudinal extent of the flange regions 3 of the profile component 1, a plurality of stamped portions 6 are arranged in the component 2. Said stamped portions 6 are preferably formed as a conventional depression and are introduced into the component 2 by means of a conventional stamping process. The stamped portions 6 are formed raised in the direction of the profile component 1 and are arranged between profile component 1 and component 2 in such a manner that they interrupt the linear or virtually linear adhesive connection along the flange regions 3.

A height H of the stamped portions 6 is formed so as to correspond to a minimum layer thickness of the adhesive agent 4 of the adhesive connection. The stamped portions 6 are designed so as to correspond to the flange regions 3 in such a manner that the profile component 1 which is arranged on the component 2 rests with the flange regions 3 thereof at least in sections on the stamped portions 6. The stamped portions 6 here can protrude over the flange regions 3 laterally and/or on the end side.

In a particularly advantageous embodiment, recesses 11 can be arranged in the stamped portions 6 and in the flange regions 3, said recesses being formed so as to correspond and preferably being arranged congruently one above another.

Stamped portions 6 and portions coated with adhesive agent 4 are therefore arranged in an alternating manner, in a way illustrated in FIG. 1, over the course of the flange region 3. No adhesive agent 4 is arranged here in particular in the region of the stamped portions 6.

This avoids an extensive cohesive connection between profile component 1 and component 2 that is customary in the prior art. Particularly advantageously, the surface unevennesses, such as, for example, bulges or waves, resulting from such an extensive cohesive connection and the different thermal expansions of the materials of profile component 1 and component 2 are reliably avoided in the hybrid component 9.

During the production of the adhesive connection between the component 2 and the flange regions 3 of the profile component 1, the adhesive agent 4 is applied between the stamped portions 6 and the profile component 1 is placed onto the component 2. In the process, a pressing force necessary for forming the adhesive connection is introduced into the flange regions 3 preferably in the region over the stamped portions 6. If the flange regions 3 rest in a form-fitting manner on the stamped portions 6, the adhesive agent 4 is distributed over the remaining flange region with a uniform minimum layer thickness which corresponds to the height H of the stamped portions 6.

In a particularly advantageous embodiment, conventional spikes can be introduced into the recesses 11 in the stamped portions 6 and in the flange regions 3, which recesses are arranged congruently one above another, said spikes permitting a uniform alignment of profile component 1 and component 2 with high replication accuracy even in series production.

In an alternative embodiment, conventional fastening means can be reversibly introduced into the recesses 11, said fastening means being removable after the adhesive agent 4 has cured.

In a further advantageous embodiment (not illustrated), the adhesive connection between profile component 1 and component 2 can additionally be secured by means of a plurality of nonreleasable rivet connections which can be formed in the recesses 11.

LIST OF REFERENCE SYMBOLS

1 Profile component
2 Component
3 Flange region
4 Adhesive agent
5 Base surface
6 Stamped portion
7 Side edge
8 Opposite side edge
9 Hybrid component
10 Interior space
11 Recess
H Height
$B_1$, $B_2$ Width
$M_1$, $M_2$ Center line
P Pressing force

The invention claimed is:

1. A joining process for a cohesive connection of at least two components, comprising:
   cohesively connecting a profile component, which has at least one substantially planar flange region, to a shaped component by
      stamping a two-dimensional portion of the shaped component to introduce at least one stamped portion into the shaped component, wherein the stamped portion is configured to receive the planar flange region of the profile component,
      disposing an adhesive between the profile component and the shaped component only in the stamped portion,
      placing the substantially planar flange region of the profile component onto the stamped portion of the shaped component,
   wherein an entire width of the stamped portion corresponds to an entire width of the planar flange region,
   wherein the height of the stamped portion corresponds to a minimum layer thickness of the adhesive.

2. The joining process as claimed in claim 1, wherein the profile component and the shaped component are adhesively connected.

3. The joining process as claimed in claim 1, wherein the stamped portion is formed raised in a direction facing away from the profile component, wherein the planar flange region of the profile component and the shaped component are adhesively connected in the region of the stamped portion.

4. The joining process as claimed in claim 1, wherein the at least one stamped portion is arranged in the shaped component and extends along a longitudinal extent of the planar flange region of the profile component.

5. The joining process as claimed in claim 2, wherein the stamped portion is formed so as to correspond to the planar flange region.

6. The joining process as claimed in claim 1, wherein the profile component has a region with a U-shaped cross section, wherein two substantially planar flange regions extend from either side of the region with the U-shaped cross section.

7. The joining process as claimed in claim 6, wherein the two substantially planar flange regions of the profile component are placed onto the shaped component such that an interior space is formed between the profile component and the shaped component.

8. The joining process as claimed in claim 6, wherein stamped portions are introduced into the shaped component along a longitudinal extent of the two substantially planar flange regions of the profile component, the height of the stamped portions is designed so as to correspond to a minimum layer thickness of the adhesive and the stamped portions are formed raised in the direction of the profile component and are arranged between the profile component and the shaped component in such a manner that the stamped portions interrupt a linear or virtually linear adhesive connection between the profile component and the shaped component, wherein the profile component arranged on the shaped component rests with the two substantially planar flange regions thereof at least in sections on the stamped portions.

9. The joining process as claimed in claim 6, wherein recesses are arranged in the stamped portions and in the planar flange regions, said recesses being formed so as to correspond to each other and being arranged congruently one above another when an adhesive connection is formed.

* * * * *